No. 868,285. PATENTED OCT. 15, 1907.
R. MÜLLER.
MACHINE FOR CHAIN MAKING.
APPLICATION FILED MAR. 29, 1907.
2 SHEETS—SHEET 1.
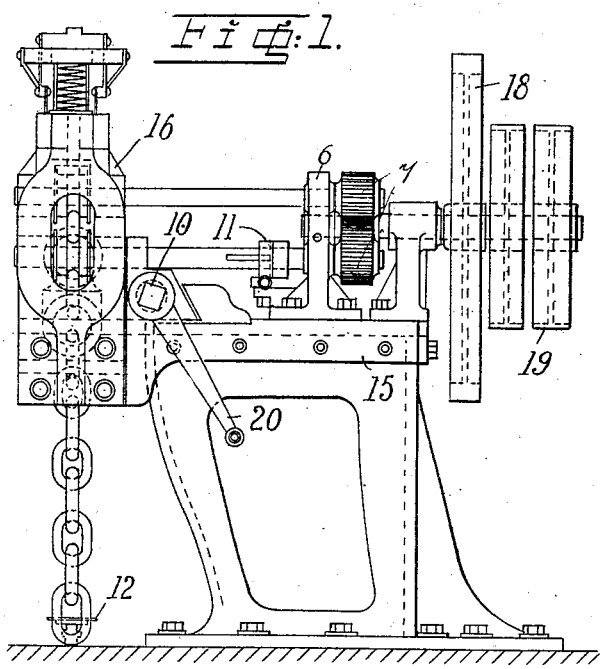
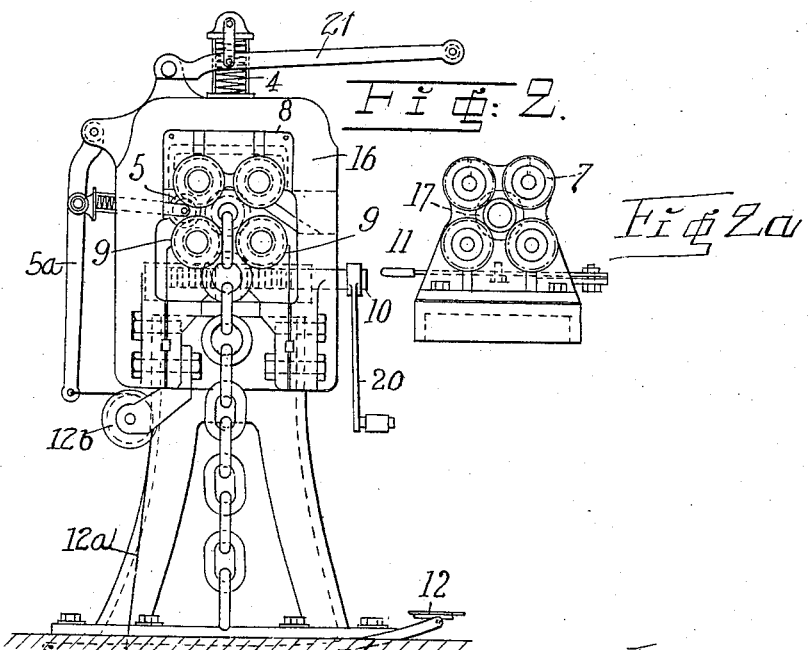
Witnesses
Inventor
R. Müller
Shepherd & Parker
Attorneys No. 868,285. PATENTED OCT. 15, 1907.
R. MÜLLER.
MACHINE FOR CHAIN MAKING.
APPLICATION FILED MAR. 29, 1907.

2 SHEETS—SHEET 2.

Witnesses
G. Rex Frye
Myron F. Clear

Inventor
R. Müller
by Shepherd & Parker
Attorneys

UNITED STATES PATENT OFFICE.

RUDOLF MÜLLER, OF GÖTEBORG, SWEDEN.

MACHINE FOR CHAIN-MAKING.

No. 868,285.  Specification of Letters Patent.  Patented Oct. 15, 1907.

Application filed March 29, 1907. Serial No. 365,410.

*To all whom it may concern:*

Be it known that I, RUDOLF MÜLLER, a subject of the King of Sweden, residing at Göteborg, in Sweden, have invented certain new and useful Improvements in Machines for Chain-Making, of which the following is a specification.

Figure 3:
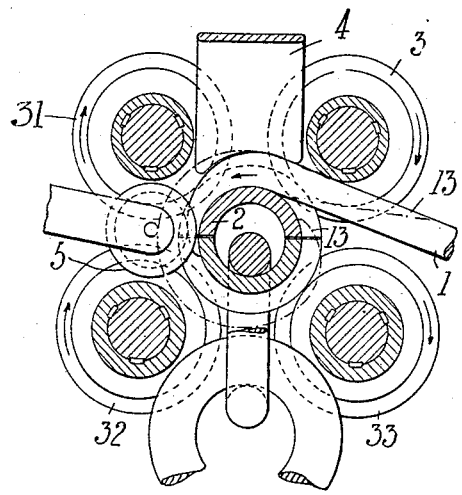
Figure 4:
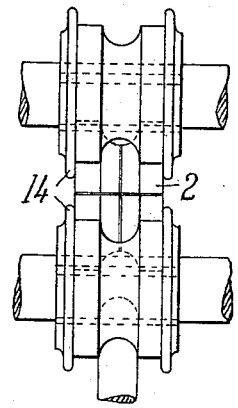
Figure 5:
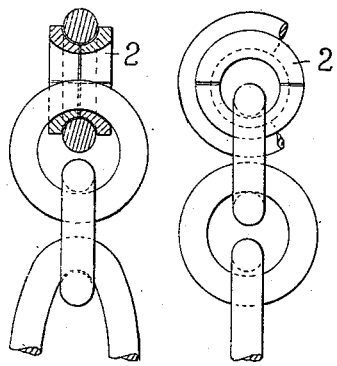
Figure 6:
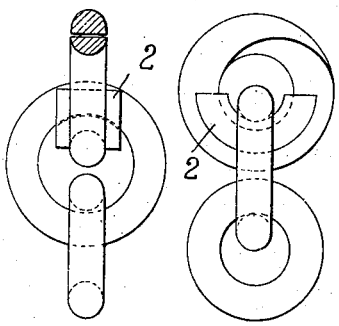

The present invention, which relates to a machine for the manufacture of chains in the usual way, so that a round piece of iron, provided with beveled ends, is bent round a ring shaped body in which the previous link of the chain is hooked, is embodied in the adjoining drawings, in which, Figure 1 is a side elevation of a machine embodying my improvements. Fig. 2 is a front elevation of the same. Fig. 2ª is a face view of the bearing plate supporting the pressure roller shafts. Fig. 3 is a vertical sectional view taken through the welding and pressure rollers. Fig. 4 is a side elevation of said welding and pressure rollers, and Figs. 5 and 6 are details partly in elevation and partly in section illustrating the construction and function of the welding roller in connection with a link chain in its course of manufacture.

The machine consists of a welding ring 2 which is surrounded by four pressure rollers 3, 31, 32, 33 a bending hammer 4 and a roller former 5. The ring 2 which is circular and provided all round its surface with a semicircular groove consists of four parts and is shown in side view in Fig. 3, end view in Fig. 4 and cross section and side view in Fig. 5. Through the welding ring being made in four pieces it is possible to introduce the same into an already welded link and to take it off, which latter process takes place by first removing the two upper quarter pieces at the side (Fig. 6) whereupon the two lower sections are given a half turn so as to take up the same position which the former previously occupied and they can then be removed in the same way as those. In order to keep the parts of the welding ring together while the round piece of iron is being bent and welded the pressure rollers, which surround them, are provided with flanges 14 all round their outside edges, while the cylindrical parts of the pressure rollers lie against the respective parts of the welding ring. All the pressure rollers which are each driven by a separate spur wheel in the same direction and through their rotation cause the welding ring to turn in the opposite direction, are provided with grooves all round which correspond with the groove upon the welding ring and have the same width as that. On the contrary however all the grooves on the pressure rollers are of unequal depth whereby the advantage is gained that the two ends of the pieces of iron during their passage between the welding ring and the first pressure roller 3 can be laid far enough over each other. The groove in pressure roller 3 is the deepest so that the welding surfaces, while passing the same, are pushed so far over each other as to receive the necessary thickness of material to make a good weld possible. In the groove on pressure roller 31, which is somewhat less deep than the previous one, the first part of the welding takes place, while the welding process is completed by pressure roller 32, which has a still shallower groove. In the groove on roller 33, which is of the same depth as the one in the welding ring, the round iron is gaged to the proper thickness.

Pressure rollers, welding ring, roller former and bending hammer are situated in a frame 16 which is suitably connected upon a supporting table 15, which carries the bearing 6 for the roller shafts. These carry spur-wheel 7, disposed round a driving wheel 17 whose shaft carries pulleys 19 from which the necessary power is obtained, and a fly-wheel 18. The two upper rollers have the same bearing 8, while the two lower ones have different bearings 9, each provided with threads corresponding with the threads of a right and left hand threaded screw 10, which is turned by a crank 20. Besides the shafts of the two lower rollers are divided into two parts which are connected by a coupling 11. By disconnecting the same and turning the screw 10 in one direction or the other the two lower rollers are moved closer together or farther apart, which movement is followed by the adjoining parts of the shafts.

The method of working the machine is the following. The lower rollers are placed apart with the help of screw 10 so that the welding ring 2 which, if a chain, which has already been started, is to be continued, is placed into the end link of the said chain and may be introduced from the front side of the machine between the pressure rollers. As soon as the lower rollers are placed close to each other again by turning screw 10 and the machine is started, the welding ring begins to revolve. The round iron bars are cut into certain previously determined lengths, so that the ends are sharply beveled. The heating takes place at the same time at both ends in separate double blasts or forges in such a way that the end points themselves are pushed outside the fire so that they cannot get burned off. While the ends are being heated the remaining part of the piece of iron is simultaneously made red hot. When the heating has taken place the piece of iron is placed through an opening in frame 16 between roller 3 and welding ring 2 with a separate pair of tongs; after that its point is bent over by pulling a lever 21 on the bending hammer, seized by roller former 5, which keeps it pressed against welding ring 2 with the assistance of a pivoted treadle 12 operating a pivoted lever 5ª, to which said roller former is connected, by means of a cable 12ª arranged between said treadle 12 and said lever 5ª and over a roller 12ᵇ and in this way the circuit between the rollers and the welding ring is completed. The shape and position of the iron bar at the beginning of the operation is indicated in Fig. 3 where the dotted lines 13 show the beveled ends. When these have reached their proper position the upper end is, with the assistance of roller 3 just laid on top of the lower one, whereupon the piece of iron, bent round the ring as above stated, undergoes the first of the welding process between roller 31 and welding ring, and is completely welded between the said ring and roller 32 and gaged by roller 33. In this way the bending and welding of a piece of iron into a ring takes place; this is at the same time bent and inserted into the previous link of a chain; one operation follows the other in rapid succession through the pressure of the rollers against the material which lies against the welding ring.

By turning crank 20 and the screw 10 which is connected with it the lower rollers are separated from each other whereby the chain with welding ring is released and can easily be removed from the front side another welding ring is then placed on the opposite end of the chain, which is then placed between the rollers for the next operation while the previously used welding ring is allowed to cool down. When a chain with round links is obtained in this way, the same undergoes a rewarming process and receives then the requisite oval shape by means of the gaging press.

Having now particularly described and ascertained the nature of my said invention and in what manner the same is to be performed I declare that what I claim is:

1. The combination in a machine for manufacturing chains, of a welding ring having a semi-circular groove, a series of pressure rollers arranged thereabout and between which and said welding ring the material is worked, each of said pressure rollers having a groove of uniform width with, and varying depth from, the other of said rollers and said welding ring, and means for rotating said pressure rollers, substantially as described.

2. The combination in a machine for manufacturing chains, of a welding ring comprising separate parts and having a semi-circular groove, a series of pressure rollers arranged thereabout and between which and said welding ring the material is worked, each of said pressure rollers having a groove of uniform width with, and varying depth from, the other of said rollers and said welding ring, and means for rotating said pressure rollers, substantially as described.

3. The combination in a machine for manufacturing chains, of a welding ring having a semi-circular groove, a series of pressure rollers arranged thereabout and between which and said welding ring the material is worked, each of said pressure rollers having a groove of uniform width with, and varying depth from, the other of said rollers and said welding ring, a bending hammer and a roller former arranged between pairs of said pressure rollers to be pressed against the material, and means for rotating said pressure rollers, substantially as described.

In witness whereof I have hereunto set my hand in the presence of two witnesses.

RUDOLF MÜLLER.

Witnesses:
IVAR SETTSEBERG,
JOHN. JOHANSSON.